(12) United States Patent
Kim et al.

(10) Patent No.: US 12,473,521 B2
(45) Date of Patent: Nov. 18, 2025

(54) THREE-DIMENSIONAL CELL CULTURE CONTAINER

(71) Applicants: KOREA BASIC SCIENCE INSTITUTE, Daejeon (KR); KOREA UNIVERSITY RESEARCH AND BUSINESS FOUNDATION, Seoul (KR)

(72) Inventors: Jeong Ah Kim, Daejeon (KR); Young Hye Kim, Cheongju-si (KR); Yeong Jun Yu, Cheongju-si (KR); Seok Chung, Seoul (KR); Ji Hun Yang, Incheon (KR)

(73) Assignees: KOREA BASIC SCIENCE INSTITUTE, Daejeon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 809 days.

(21) Appl. No.: 16/645,539

(22) PCT Filed: Dec. 20, 2017

(86) PCT No.: PCT/KR2017/015160
§ 371 (c)(1),
(2) Date: Mar. 9, 2020

(87) PCT Pub. No.: WO2019/050101
PCT Pub. Date: Mar. 14, 2019

(65) Prior Publication Data
US 2020/0283711 A1 Sep. 10, 2020

(30) Foreign Application Priority Data
Sep. 7, 2017 (KR) .................. 10-2017-0114829

(51) Int. Cl.
*C12M 1/32* (2006.01)
*C12M 3/00* (2006.01)
(Continued)

(52) U.S. Cl.
CPC ............ *C12M 23/12* (2013.01); *C12M 21/08* (2013.01); *C12N 5/0606* (2013.01);
(Continued)

(58) Field of Classification Search
CPC ......... B01L 3/502746; B01L 3/502753; B01L 2300/0851; C12M 23/12; C12M 23/16; C12M 27/18
See application file for complete search history.

(56) References Cited

U.S. PATENT DOCUMENTS

| | | | |
|---|---|---|---|
| 2006/0018797 A1* | 1/2006 | Burnell | G01N 1/34 204/601 |
| 2012/0003675 A1* | 1/2012 | Retterer | B82Y 40/00 435/68.1 |
| 2012/0258475 A1* | 10/2012 | Tang | G01N 33/53 422/69 |
| 2016/0002583 A1 | 1/2016 | Hlinka et al. | |

FOREIGN PATENT DOCUMENTS

| | | | |
|---|---|---|---|
| CN | 107109341 A | 8/2017 | |
| KR | 10-2013-0120032 | * 4/2013 | ............ C12M 23/16 |

OTHER PUBLICATIONS

EngMT-Pyo, K.D. et al. Microfluidic perfusion device for cell culture and the application study and fabrication method thereof. KR 10-2013-0120032.Date of Pub.: Nov. 4, 2013.pp. 1-32.*

* cited by examiner

*Primary Examiner* — Jill A Warden
*Assistant Examiner* — Dwayne K Handy
(74) *Attorney, Agent, or Firm* — NSIP Law

(57) ABSTRACT

The present invention relates to a three-dimensional cell culture container. A cell culture container according to the present invention may include: a barrier part composed of two or more pillars (110) provided on the top side of the
(Continued)

lower plate; an upper plate (130) which finishes an opened end portion of the barrier part; and one or more cell sample injection guide parts (220) provided in one side of the upper plate. The present invention using such configurations can stably inject a sample including cells into an accurate position in a state that the sample leans on the guide parts, and the inlet guide may perform a barrier function such that a flow of the sample is directed toward the culture container, and the upper plate and the plurality of pillars facilitate an operation of an experimenter by performing a helping function such that an appropriate amount of sample is injected easily and uniformly, while the pillar parts spaced apart from one another at predetermined intervals enable a stable cell culturing process to be performed by performing a barrier function of preventing a gel-type sample from being discharged to the outside and performing a function of opening a space for exchanging materials with a medium in an external cell.

2 Claims, 6 Drawing Sheets

(51) Int. Cl.
*C12N 5/0735* (2010.01)
*C12N 5/074* (2010.01)
*C12N 5/00* (2006.01)
*C12N 5/0793* (2010.01)

(52) U.S. Cl.
CPC .......... *C12N 5/0607* (2013.01); *C12N 5/0062* (2013.01); *C12N 5/0619* (2013.01); *C12N 2513/00* (2013.01); *C12N 2535/00* (2013.01)

THREE-DIMENSIONAL CELL CULTURE CONTAINER

CROSS REFERENCE TO RELATED APPLICATIONS

This application is a U.S. National Stage Application of International Application No. PCT/KR2017/015160, filed on Dec. 20, 2017, which claims the benefit under 35 USC 119(a) and 365(b) of Korean Patent Application No. 10-2017-0114829, filed on Sep. 7, 2017 in the Korean Intellectual Property Office, the entire disclosure of which is incorporated herein by reference for all purposes.

TECHNICAL FIELD

The present invention relates to a three-dimensional cell culture container. More specifically, the present invention relates to an instrument having a structure which enables an experimenter to accurately inject a predetermined amount of a cell sample to a predetermined height into a container, enables cells injected into the container to appropriately perform a material exchange process with a culture medium, and enables cell culture results to be easily observed, as a container for facilitating three-dimensional cell culture.

BACKGROUND ART

An analysis technique based on living cells are primarily being utilized in the development of new pharmaceuticals and pharmacokinetic test as well as various fundamental researches. There is an increasing trend of related industry demands of the analysis technique since a cell-based analysis technique is excellent in the aspect of human biomimetics and is economical in the aspects of period and costs compared to an existing biochemical analysis or an analysis method using experimental animal model. Further, the cell-based analysis technique has a merit of enabling an overall research of molecular mechanisms associated with drug reaction since the cell-based analysis technique can study drug characteristics and efficacies reflecting environments within the human body such as drug permeability measurement and the like through cellular cofactors although the cell-based analysis technique is an in vitro analysis.

Due to such a merit, the cell-based analysis technique has been in progress day by day, and development in a three-dimensional cell-based analysis technique of more accurately simulating an in vivo environment or disease state based on three-dimensional cells cultured by using a scaffold structure including collagen, an extracellular matrix, a hydrogel, and the like has actively been made in order to overcome limitations in a two-dimensional cell-based analysis technique. Particularly, due to the limitation of the two-dimensional cell culture model in case of brain tissue cells having neurons and neural stem cells which are three-dimensionally contacted in the living body, there has been a rising interest in a three-dimensional cell culture model which simulates well spatial structure and biochemical complexity of living tissues. The three-dimensional cell culture model can embody complexities of cell-to-cell connections and directional growth in an in vitro experiment since the three-dimensional cell culture model imitates well an in vivo condition, and the three-dimensional cell culture model exhibits enhanced cell survival and improved differentiation of neural stem cells compared to the two-dimensional cell culture model. Accordingly, the three-dimensional cell culture model is useful in picking up well a drug reaction and a signaling mechanism of various disease states when conducting a research on molecule-based tissue functions compared to the two-dimensional cell culture model.

It is necessary to accurately control experimental target cells from various variables in order to obtain results with a high reliability in three-dimensional cell culture and analysis based on the three-dimensional cell culture. Particularly, reliability of experimental results may be affected since it is difficult to adjust injection amount and injection type of the cell sample depending on the competence of an experimenter in a process of injecting a cell sample to be cultured into a culture device. For example, when injecting a cell sample of a gel formulation into a culture container, there may be a difficulty in microscopically observation of culturing results and quantitative analysis of the results since cells may not be evenly injected due to an interfacial energy between the container and the sample or an ambient gas, or there is a height difference between the injected cell sample. Although there is a device for injecting the cell sample to a predetermined height, problems such as culture environment, restriction on medium amount, and complexity of injection method exist. Therefore, it is necessary to develop a device capable of solving such experimental difficulties.

DISCLOSURE

Technical Problem

The present invention has been devised to solve the conventional problems, and an object of the present invention is to provide a cell culture container which safely injects a predetermined amount of cells into the cell culture container by supplementing experimental proficiency of an experimenter, supports a cell sample to enable the cell sample to exchange materials with a peripheral medium easily and appropriately, and constantly maintains height of the cell sample to facilitate microscope observation of cell culture results.

Technical Solution

To achieve the object, a cell culture container according to an embodiment of the present invention may include: a lower plate 120; a barrier part composed of two or more pillars 110 provided on the top side of the lower plate; an upper plate 130 which finishes an opened end portion of the barrier part; and one or more cell sample injection guide parts 220 provided in one side of the upper plate.

The cell culture container may be manufactured into a form in which a plurality of containers is horizontally arrayed or vertically arranged including a microplate form and a culture medium connecting form.

At least one of the cell sample injection guide parts may be positioned in one side surface of the cell culture container, and may have hole structures drawn such that an experimental tool such as a pipette or the like, i.e., an instrument for injecting a cell sample can lean on the projected hole structures.

The plurality of pillars are preferably formed in two or more pillars, the pillars have a diameter of 20 μm to 2,000 μm, a gap between the pillars is preferably 10 μm to 2,000 μm, and the pillars may be preferably disposed in a circular shape to smoothly exchange materials between a cell sample and a medium.

It is appropriate that a cell culture parts surrounded by the plurality of pillars has a diameter of 0.1 mm to 10 mm.

The upper plate may be perpendicularly connected to the pillar parts and positioned to be parallel with the lower plate, and it is appropriate that a gap between the upper plate and the lower plate is 0.05 mm to 5 mm.

Effect

The present invention using such configurations can stably inject a sample including cells into an accurate position in a state that the sample leans on an inlet guide, and the inlet guide may perform a barrier function such that a flow of the sample is directed toward the culture container, and the sample is prevented from being discharged to the outside. While the upper plate and the plurality of pillars facilitate an operation of an experimenter by performing a helping function such that an appropriate amount of sample is injected easily and uniformly, the pillar parts spaced apart from one another at predetermined intervals enable a stable cell culturing process to be performed by performing a barrier function of preventing a gel-type sample from being discharged to the outside and performing a function of opening a space for exchanging materials with a medium in an external cell. The upper plate parallel to the bottom surface allows height of a three-dimensional cell culture to be constantly maintained by determining height of the sample.

BEST MODE

Figure 1:
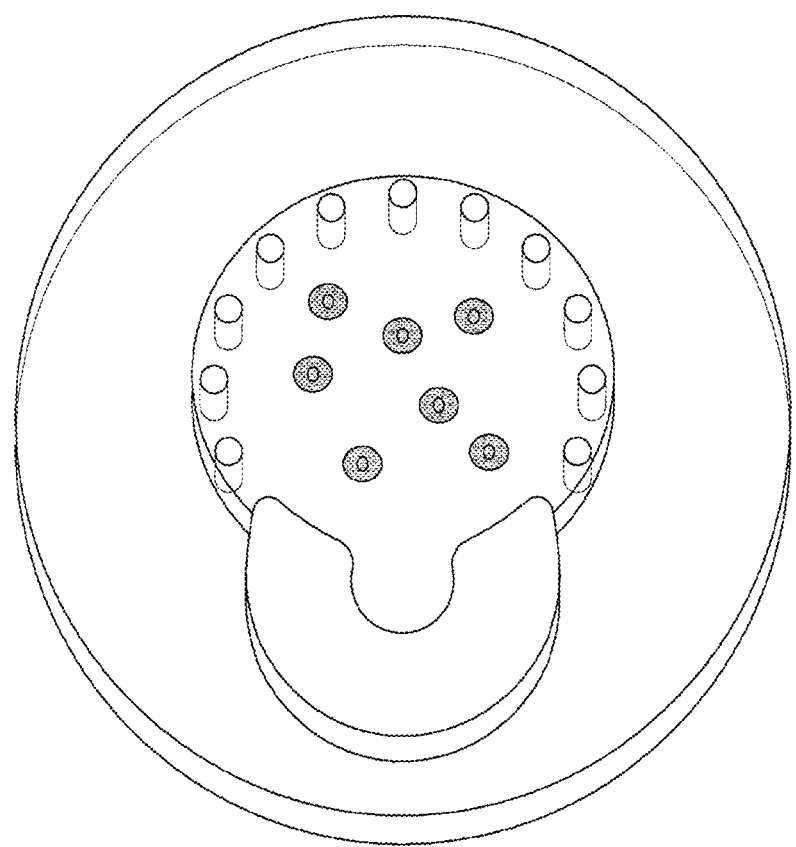
FIG. 1 is a perspective view showing structure of a three-dimensional cell culture container according to an embodiment of the present invention.
Figure 2:
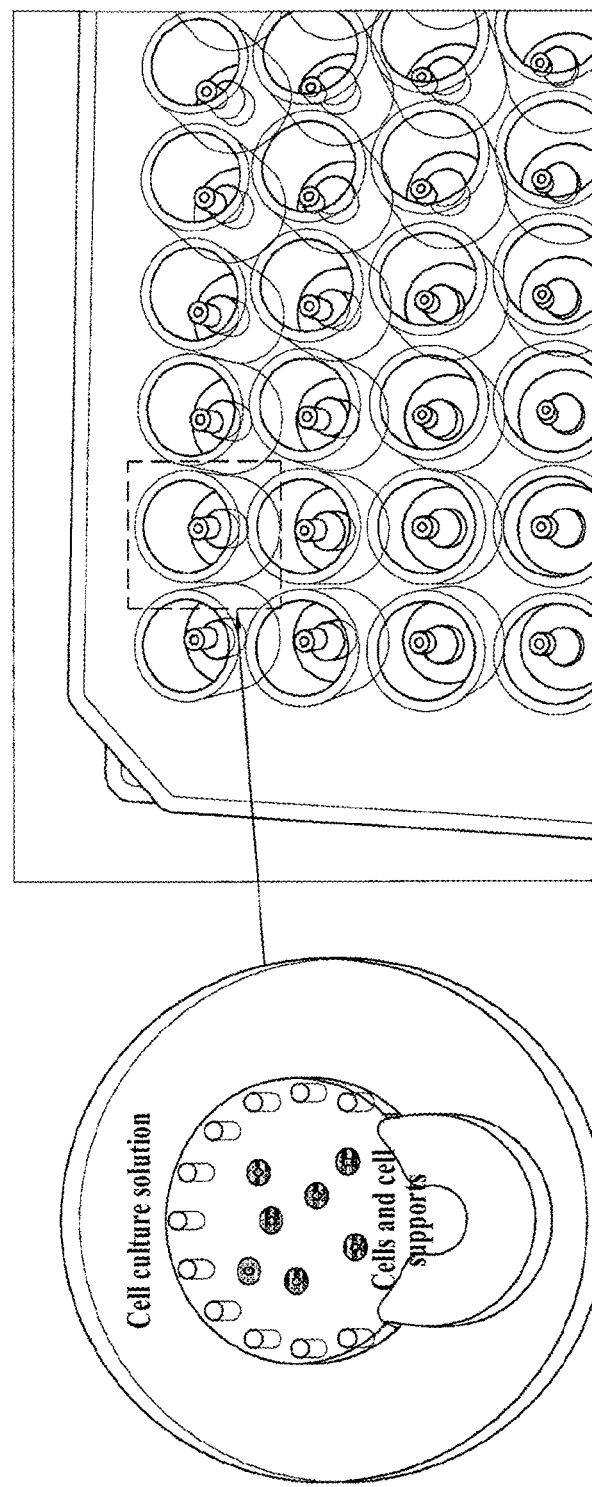
FIG. 2 is a perspective view showing that a configuration of a three-dimensional cell culture container according to an embodiment of the present invention can be manufactured into an array form or a plate form.
Figure 3:
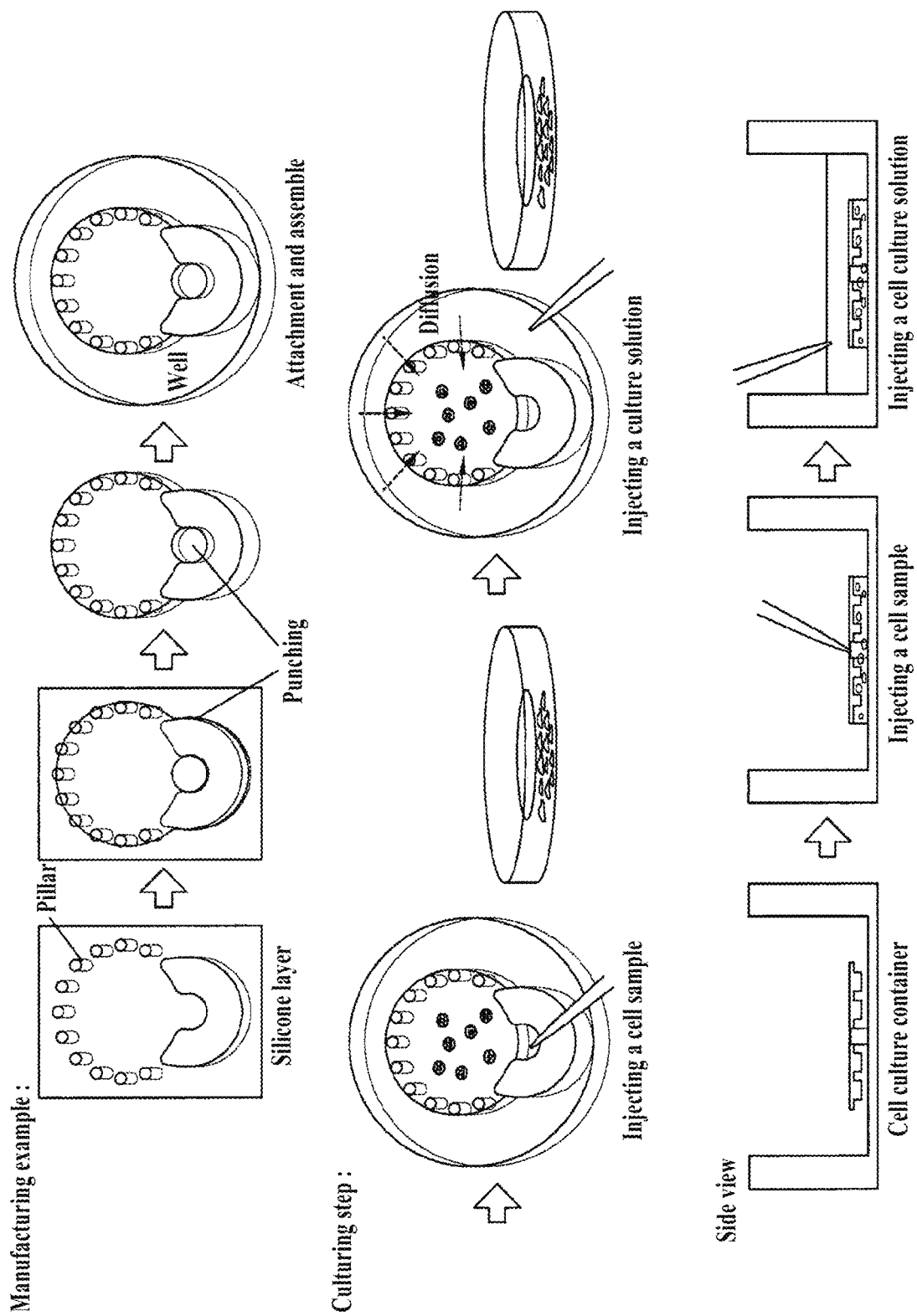
FIG. 3 is a schematic diagram describing an example of a manufacturing method of a container for implementing an embodiment of the present invention and a three-dimensional cell culture process.

The present invention will be described in detail with reference to the accompanying drawings based on specific exemplary embodiments in which the present invention may be carried out as an example. These embodiments will be fully described so that a person skilled in the art may implement the present invention. It is to be understood that the various embodiments of the present invention, although different from each other, are not necessarily mutually exclusive. For example, a specific shape, a structure, and a characteristic described herein may be implemented as another exemplary embodiment without departing from the gist and the scope of the present invention in relation to an exemplary embodiment. In addition, it is to be understood that the location or arrangement of individual elements within each disclosed embodiment may be modified without departing from the gist and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like reference numerals refer to the same or similar elements throughout the several views, and certain features such as length, area, thickness and shape may be exaggerated for convenience.

Hereinafter, exemplary embodiments of the present invention will be described in detail with reference to the accompanying drawings to enable those skilled in the art to which the present invention pertains to easily implement the present invention.

A cell culture container according to the present invention includes: a lower plate 120; a barrier part composed of two or more pillars 110 provided on the top side of the lower plate; an upper plate 130 which finishes an opened end portion of the barrier part; and cell sample injection guide parts 220 provided in one side of the upper plate.

A cell culture container according to the present invention may comprise mixtures comprising at least two of transparent ceramics including glass, silicone rubbers including at least one of polydimethylsiloxane (PDMS) and ecoflex, and engineering plastics, transparent ceramics, and silicone rubbers and engineering plastics including at least one of polystyrene, polymethylmethacrylate, polypropylene, polycarbonate and polyurethane, and mixtures comprising at least one or two of chemical variants of the transparent ceramics, the silicone rubbers, the engineering plastics, or the transparent ceramics, the silicone rubbers and the engineering plastics. Further, the cell culture container according to the present invention may comprise one or more materials which can be used as three-dimensional printer materials such as photocurable plastics, films, thermoplastic plastics, and metals, or all of chemical variants thereof.

A cell sample injection part of a cell culture container according to the present invention may be positioned in one side surface of a cell culture container configuration. The cell sample injection part preferably has a circular hole structure such that the hole structure can guide an outlet of a pipette, a syringe needle or the like for injecting a cell sample. Further, the cell sample injection part may include a barrier structure which guides a flow of liquid such that a sample is not discharged to the outside of pillars, but are filled toward the inside of a culture part.

A plurality of pillar parts of a cell culture container according to the present invention have a gap therebetween of an extent to which a gel-type cell sample is appropriately seated on inner portions of the pillar parts by surface tension of the cell sample, the gap between the pillars may be 10 to 2,000 μm, and the pillars may have a diameter of about 20 to 2,000 μm. In the pillar parts functioning as a barrier, the smaller a diameter of pillars is, the smaller a gap between the pillars also tends to be. However, restrictions arise in performing a material exchange process between cells and a culture solution, and there is a high possibility that bubbles may be formed between cracks when the gap is too narrow. There is a high possibility that a sample is discharged to the outside of the pillars while a balance between surface energy and tension between the pillars and the sample is being broken when the gap is too wide. When the pillars have a diameter of 300 μm as in Examples, a gap between the respective pillars is appropriately about 200 to 400 μm, and the gap range is suitable for seating a cell sample on inner portions of the pillars. Further, the number of pillars is formed of a number appropriate for constructing a space enabling the cell sample to seated on an inner portion thereof, and the number of 1 to 100 is appropriate. A cross-sectional shape of the pillars may include various shapes including circular, polygonal and other shapes capable of adjusting interfacial tension.

A cell culture container according to the present invention may preferably be formed in a circular shape, or other shapes besides the circular shape. Width of a culture part has a size enabling oxygen and nutrients transferred to cells inside the culture part to be smoothly supplied by sufficiently performing a material exchange process, and the cell culture part may have a diameter of about 0.1 to 10 mm when a cell culture part is formed in a circular shape. It is difficult to supply a sufficient amount of a cell sample when size of the cell culture part is too small, while the cell culture part is not appropriate as a cell culture device since the cell culture part having a too large diameter (diameter of an inscribed circle when the culture part is a polygonal) has restrictions on material transfer to the side surface thereof.

An upper plate of a cell culture container according to the present invention may be formed in such a form that the upper plate is in parallel with the bottom surface in a state that the upper plate is perpendicularly connected to the pillar parts. A height from the lower plate to the upper plate, as a distance which is suitable for observing cell culture results by a microscope, is appropriately 0.05 to 5 mm. It is difficult to sufficiently secure the number of observation target cells within an observation range when the height from the lower plate to the upper plate is 0.05 mm or less, while it is not appropriate to observe the cell culture results by the microscope due to problems including overlapping of cells that are an observation target when the height from the lower plate to the upper plate is 5 mm or more.

The present invention will be described in more detail through the following Examples. However, the following Examples are only for embodying contents of the present invention, and the present invention is not limited thereby.

Example 1. Drawing a Desirable Gap Between Pillar Parts

A cell sample loading experiment was carried out after maintaining a gap between the pillars of 200 μm to 400 μm at intervals of 100 μm to draw a gap between the pillars suitable for being fixed to the inside of a barrier from which the cell sample is not eluted, and which is comprised of a plurality of pillars by considering surface energy between a gel-type cell sample generally used and the surface of the container. 2 mg/ml of collagen was used as an injected sample, and the pillars had a diameter of 300 μm at this time. Thickness of the upper plate or the bottom surface (thickness of the sample) was fixed to 250 μm.

Figure 4:
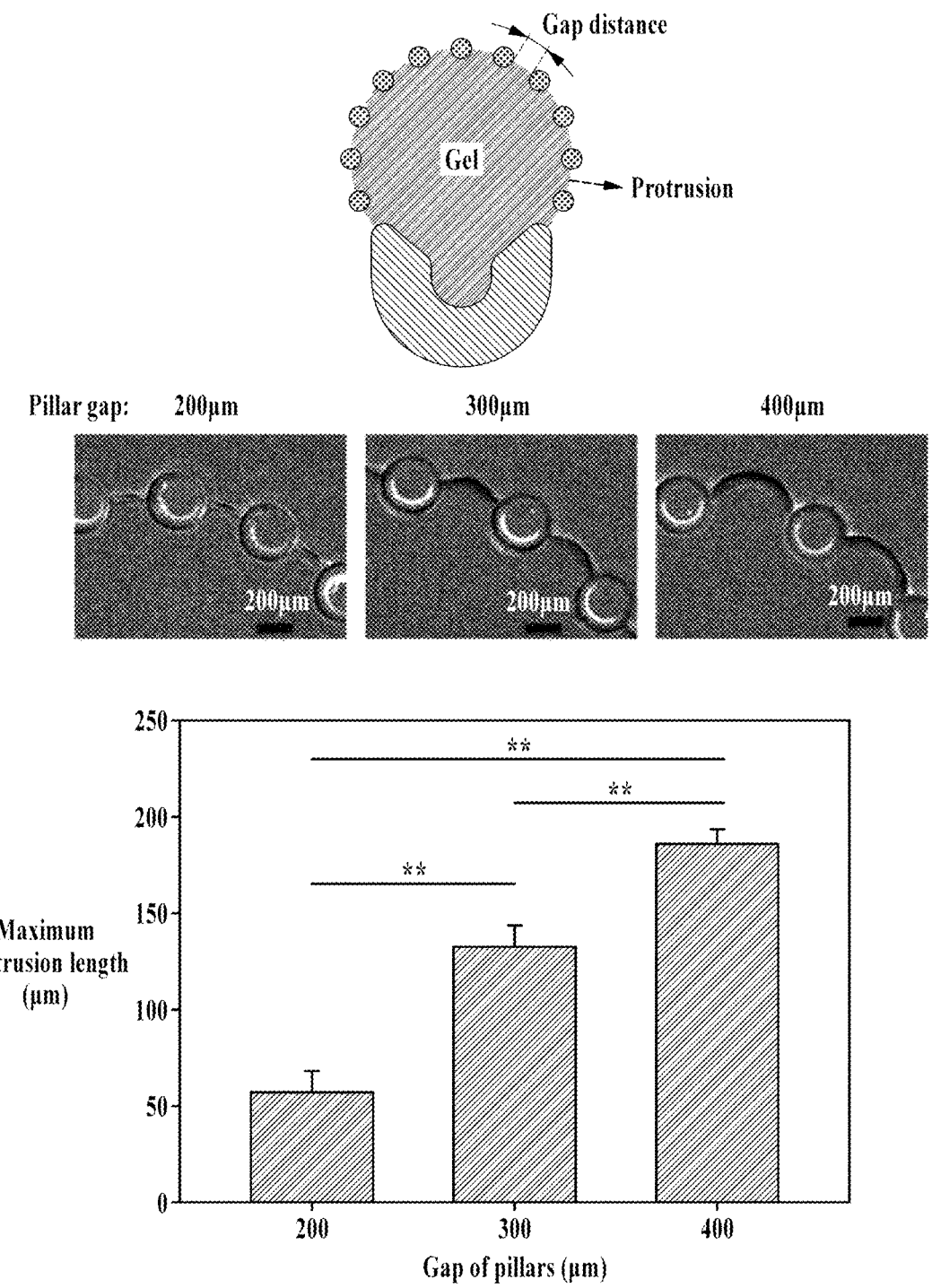
FIG. 4 is a drawing showing experimental results for drawing an appropriate gap between pillar parts of a cell culture container by considering surface tension during injection of a cell sample.

As results of the experiment, as it can be confirmed in FIG. 4, there is a tendency that the more the gap between the pillars is increased from 200 μm to 400 μm, the more interface of the gel-type cell sample is projected to the outer side. That is, since the sample may be leaked to the outside of the pillars when the gap between the protrusion structures is large, it is necessary to maintain an optimal gap between the pillars depending on diameter of the pillars and diameter of the culture part. It can be confirmed in the present experiment that the gel-type cell sample is not eluted to the outside of the pillars, but are appropriately positioned on an inner portion of the barrier comprised of the pillars due to tension of the gel-type cell sample at a gap between the pillars of 200 μm to 400 μm when the diameter of the pillars is fixed to 300 μm.

Figure 5:
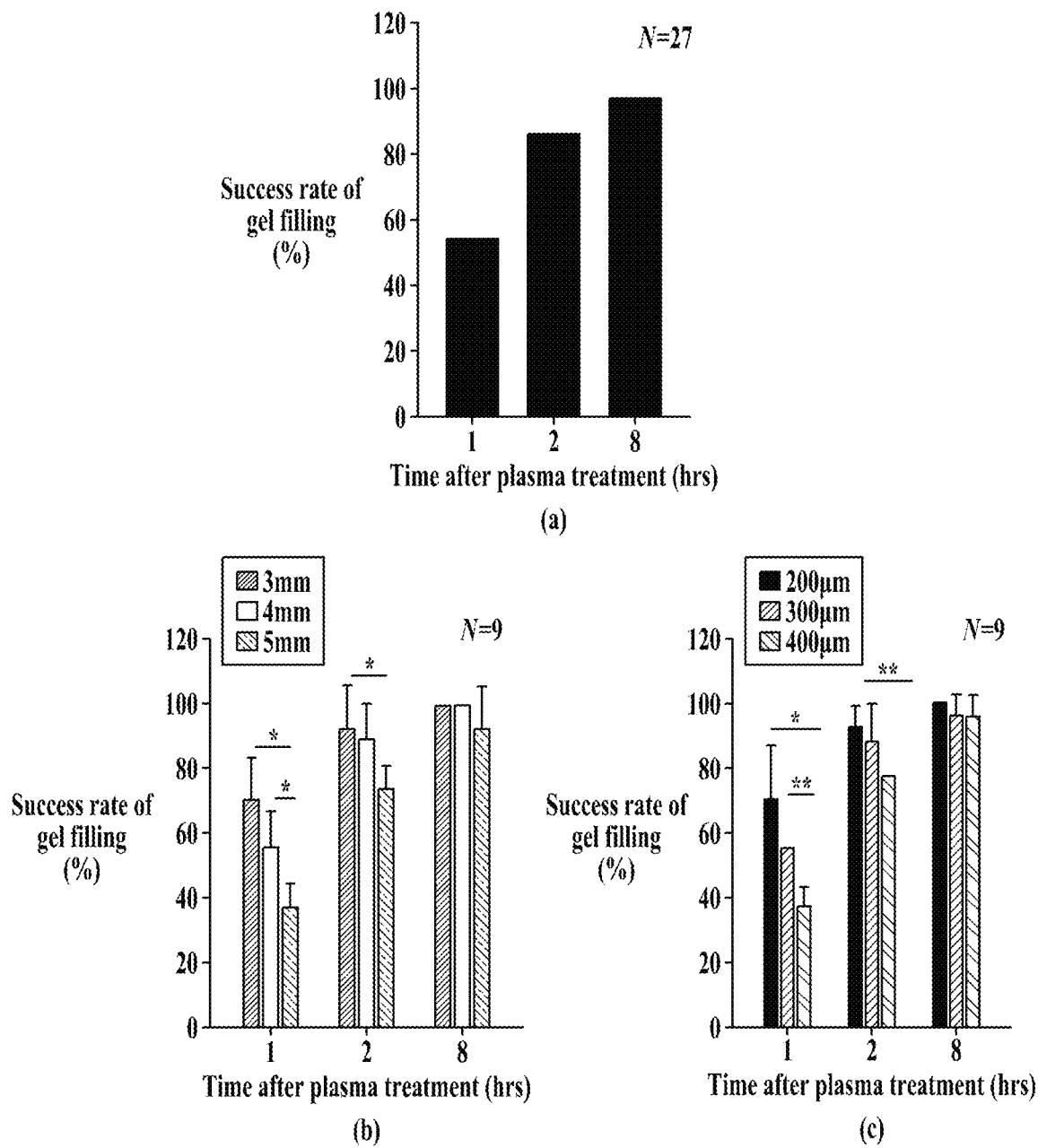
FIG. 5 is a drawing showing results for effects of diameter of a culture part and a gap between pillars on loading success rate of a sample liquid according to changes in surface properties of the container, as an experiment for confirming a form in which a cell sample liquid is injected into a cell culture part.

Example 2. Success Rate of Sample Injection According to Hydrophilicity Degree of Container Surface In the present experiment, after performing a hydrophilic treatment process (a plasma treatment process) on a cell culture device and surfaces of pillars, a success rate of determining if samples injected into a container were well seated on an inner portion of the container was examined. Right after performing the plasma treatment process, the container is hydrophilic by having a high surface energy, and the container gradually recovers hydrophobicity as time goes by. Since the surfaces of the pillars have good wettability when the surfaces of the pillars are hydrophilic, the sample easily comes out to the outside of the pillars, and a sample loading failure rate is increased, while a sample loading success rate is increased by surface tension of liquid as the surfaces of the pillars recover hydrophobicity. In order to maximize effects of a gap between the pillars and diameter of an injection part on loading in the present experiment, how successful loading was confirmed within 8 hours after performing a hydrophilic treatment process on the surfaces of the pillars. In this experiment, it was defined to be failure when the sample is discharged to the outside of one or more pillars, while it was defined to be success when the sample is successfully seated on inner portions of the pillars. FIG. 5(A) shows a probability of succeeding in loading of the sample on a hydrophilic surface according as time changes. As shown in the graph, the loading success rate of the sample after 8 hours is shown to be near 100% as loading success rate of the sample is gradually increased while the hydrophilic surface is changed from hydrophilicity to hydrophobicity as time goes by. This shows a possibility of success in sample loading of a pillar structure. FIG. 5(B) shows effects of diameter sizes of a cell culture part on loading success rate. It is observed that the larger the diameters of the culture part on a very hydrophilic surface (time after plasma treatment of 1 hour), the higher probabilities that a solution is leaked to the outside of peripheral pillars before the sample is finally filled in the culture part. The probabilities are gradually decreased according to a hydrophobicity recovering time, and a loading success rate reaches 100% after 8 hours irrespective of the diameter sizes of the cell culture part. Further, sample loading probabilities according to gaps between peripheral pillar parts of the culture part were measured in FIG. 5(C). Similarly, it can be confirmed that the larger the gaps between the pillars on a very hydrophilic surface (time after plasma treatment of 1 hour), the higher probabilities that a sample is leaked to the outside of the pillars. As the probabilities are decreased as time goes by, there are hardly any failure rate irrespective of the gaps after 8 hours at which hydrophobicity is recovered. Through this, effects of the gaps between the pillar parts and the diameters of the culture part on a cell loading success rate can be confirmed, and it is proved that a cell sample can be filled very effectively as a cell loading probability reaches almost 100% on a surface where surface energy is not high.

Example 3. Drawing Size of a Cell Injection Part Through Confirmation of Material Exchange of Cells with a Medium In order to draw size of a cell injection part of a level capable of appropriately performing a material exchange process between a medium and a cell sample inside a barrier formed in a plurality of pillars, a material exchange experiment was conducted at intervals of 1 mm from 2 mm to 5 mm of diameter of a cell loading part. Thickness of the upper plate or the bottom surface (thickness of the sample) was fixed to 250 μm.

Figure 6:
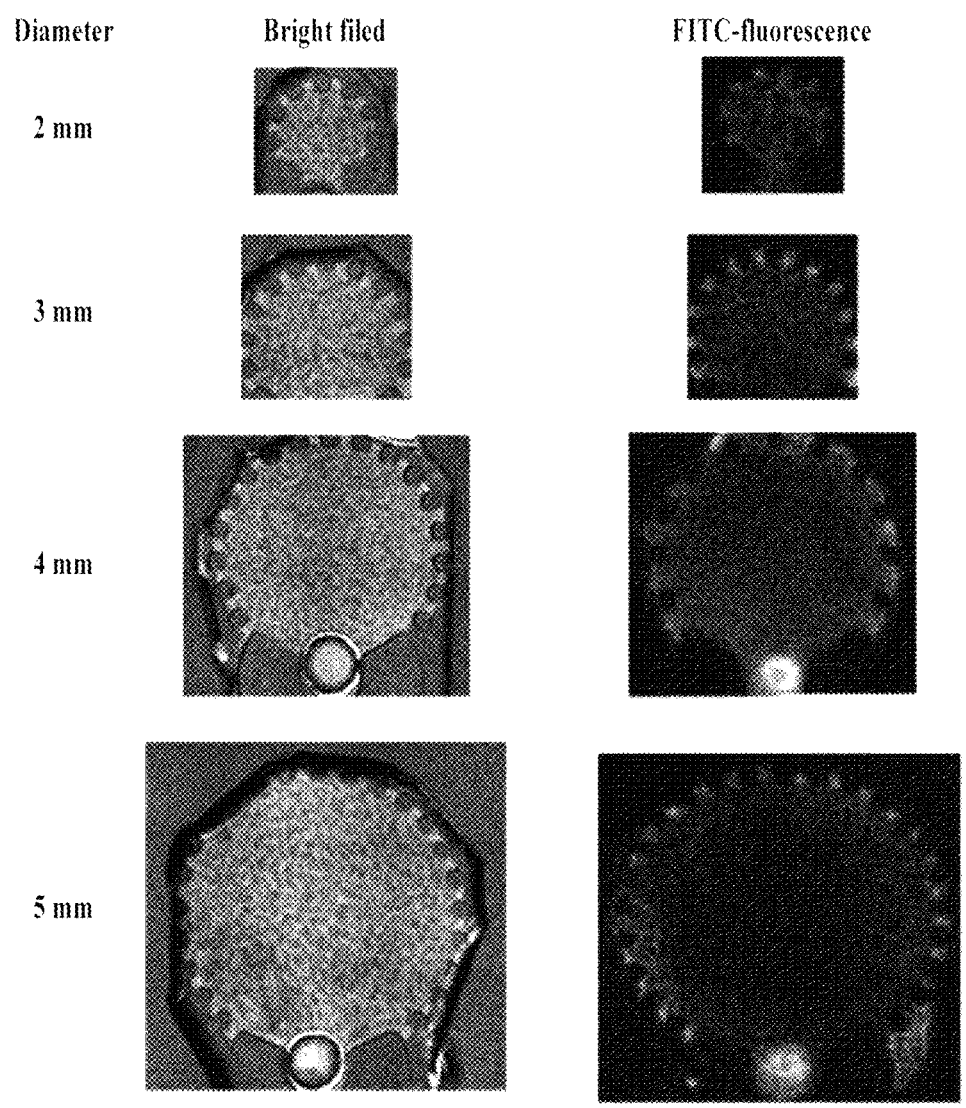
FIG. 6 is a drawing showing results of an experiment for confirming an extent to which a process of exchanging materials with a medium is performed according to diameter of the cell culture part through an actual cell culturing and differentiating experiment.

ReN-VM (Neural stem cell) was used as a cell, and cell culturing conditions and observation criteria are as follows.
  Name of cell: ReN-VM (Neural stem cell)
  Matrigel concentration: 5.7 mg/ml
  Cell concentration: $1.0 \times 10^7$ cells/ml
  Culture period: 1 week
  Staining method: FITC-phalloidin, 50 min As results of the experiment, it can be confirmed as illustrated in FIG. 6 that differentiation is well performed at a diameter of the cell culture part from 2 mm to 4 mm by a culture solution and a gel environment in which neural stem cells are injected in the entire of a cell culture part. Namely, it can be confirmed that the entire sample range smoothly performs a material exchange process with the medium. However, when looking at the experimental results from the point of view of a limited dyeing time of 50 minutes, spreading extent of a dyeing solution seems to be the most uneven at a diameter of the cell culture part of 5 mm. This means there may be restrictions on an infinite increase in diameter of the cell culture part.

Although the present invention has been described as the above-mentioned exemplary embodiments, the above-mentioned exemplary embodiments can be variously modified or changed without departing from the gist and the scope of the present invention. Further, the scope of the appended claims includes such a modification or change belonging to the gist of the present invention.

The invention claimed is:

1. A cell culture container for three-dimensional cell cultures including:
  a lower plate;
  a barrier part comprising pillars provided on a top side of the lower plate;
  an upper plate which finishes an opened end portion of the barrier part; and
  one or more cell sample injection guide parts, provided in one side of the upper plate, oriented at a predetermined height relative to a culture portion of the lower plate enclosed by the barrier part, and configured to guide injection of a gel-type sample of a predetermined amount and at the predetermined height, to the culture portion,
  wherein the pillars are radially arranged between the upper plate and the lower plate such that the barrier part is formed in a circular shape,
  wherein the pillars of the barrier part have a gap of 200 μm to 2,000 μm therebetween,
  wherein the radial arrangement and the gap of the barrier part are configured to maintain a surface tension of the gel-type sample and prevent elution of the gel-type sample, of the predetermined amount and at the predetermined height from the culture portion,
  wherein the barrier part is configured to permit material exchange between the gel-type sample and a peripheral medium,
  wherein the predetermined height is above the lower plate and below the upper plate,
  wherein the barrier part extends perpendicularly from the top side of the lower plate to a bottom side of the upper plate to thereby separate the upper plate from the lower plate, which are substantially parallel to each other, by a gap therebetween of 0.05 mm to 5 mm,
  wherein the upper plate does not extend beyond the barrier part,
  wherein the pillars each have a diameter or width of 300 μm to 2,000 μm and
  wherein the circular shape of the barrier part has an inner diameter of 2 mm to 10 mm.

2. A cell culture array having a structure including a plurality of the cell culture containers of claim 1 arranged in an array.

* * * * *